(12) United States Patent
Choi

(10) Patent No.: US 6,538,833 B2
(45) Date of Patent: Mar. 25, 2003

(54) SYSTEM AND METHOD FOR IMPROVING FREQUENCY RESPONSE IN A MAGNETO-RESISTIVE PREAMPLIFIER

(75) Inventor: Davy H. Choi, Garland, TX (US)

(73) Assignee: Texas Instruments Incorporated, Dallas, TX (US)

(*) Notice: Subject to any disclaimer, the term of this patent is extended or adjusted under 35 U.S.C. 154(b) by 1 day.

(21) Appl. No.: 09/768,815

(22) Filed: Jan. 23, 2001

(65) Prior Publication Data

US 2002/0131193 A1 Sep. 19, 2002

(51) Int. Cl.$^7$ ................................................ G11B 5/09
(52) U.S. Cl. ............................ 360/46; 360/67; 360/65; 330/282
(58) Field of Search ........................... 360/67, 46, 65, 360/66, 68; 330/271, 282, 291, 302, 303, 86, 98

(56) References Cited

U.S. PATENT DOCUMENTS 6,061,192 A  5/2000  Ogiwara
6,111,711 A  *  8/2000  Barber et al. .................. 360/67

* cited by examiner

*Primary Examiner*—Alan T. Faber
(74) *Attorney, Agent, or Firm*—W. Daniel Swayze, Jr.; W. James Brady; Frederick J. Telecky, Jr.

(57) ABSTRACT

A preamplifier system includes an amplifier stage having at least one feedback network. The feedback network has a feedback resistance that may be adjusted to improve a frequency response of the preamplifier. A feedback control system is operative to set the resistance of the feedback network as a function of a resistance value of an associated read/write head.

20 Claims, 8 Drawing Sheets

SYSTEM AND METHOD FOR IMPROVING FREQUENCY RESPONSE IN A MAGNETO-RESISTIVE PREAMPLIFIER

TECHNICAL FIELD

The present invention relates to disk drive circuits and, more particularly, to a system and method for improving frequency response of a preamplifier in a hard-disk drive.

BACKGROUND

A hard disk drive generally includes a stack of rotating disks or platters and a spindle motor that is controlled to cause the disks to rotate. Data is generally stored in the form of a sequence of magnetically polarized regions on the surface of the disk. The sequences, known as tracks, typically appear as concentric circles on the disk.

A magneto-resistive ("MR") read/write head, which is sensitive to changes in magnetic flux, reads and/or writes data to a disk as it is supported by an arm above the surface of the disks in close proximity to the surface thereof. As a disk rotates under the read/write head, the read/write head "flies" on a thin cushion of air created by the motion of the disk. The read/write head reads data from a disk by sensing flux changes (e.g., changes in polarity) on the magnetic surface of an associated disk as it passes beneath the read/write head. The flux change, in turn, causes a change in the resistance of the head. The MR read/write head provides a corresponding differential output signal to an associated differential MR preamplifier.

Figure 1:
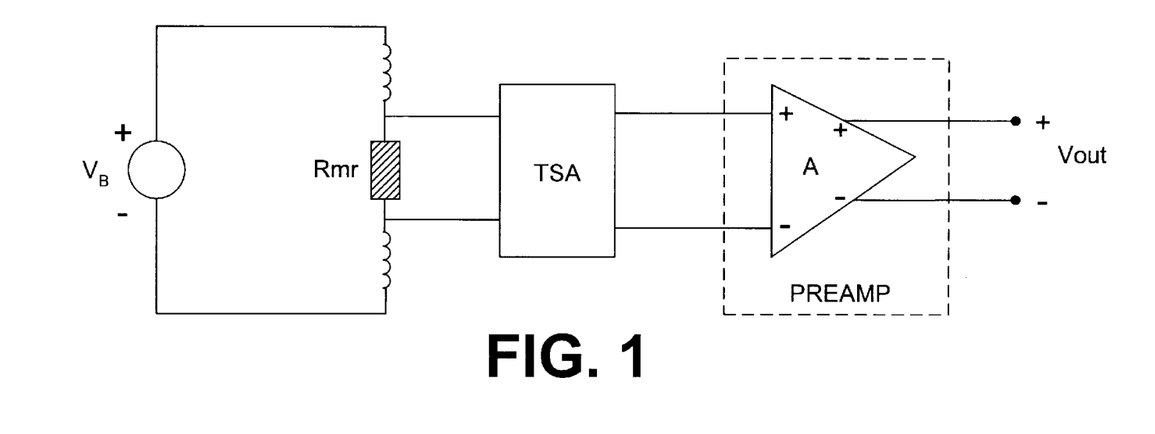
FIG. 1 is a background figure illustrating an example of hard-disk drive head and preamplifier system.
Figure 2:
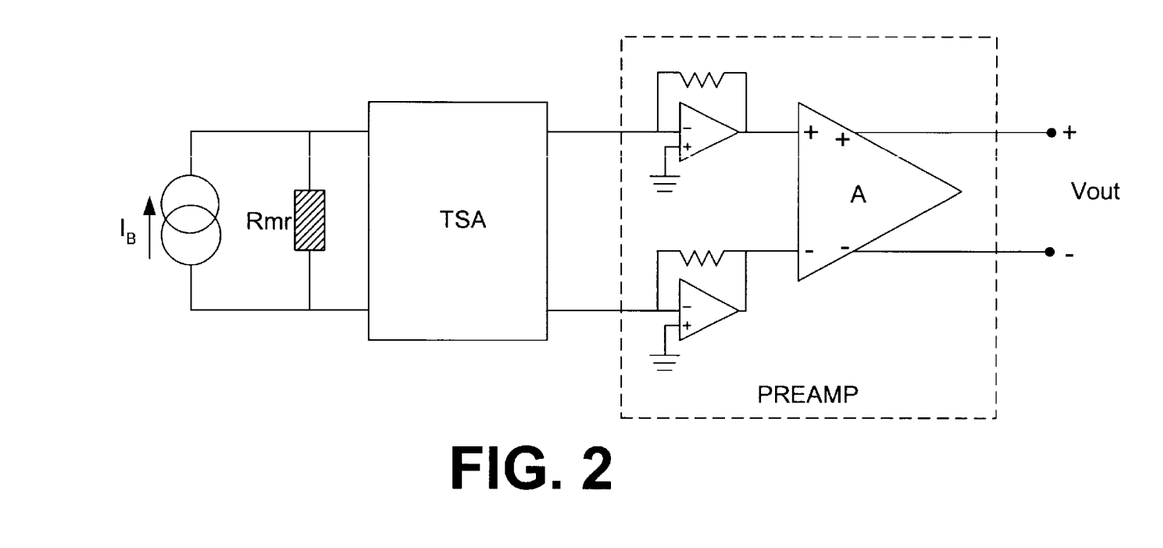
FIG. 2 is a background figure illustrating another example of hard-disk drive head and preamplifier system.

Background FIGS. 1 and 2 respectively illustrate two of several possible combinations of head bias (e.g., voltage or current source) and sense schemes, such as are commonly employed in hard-disk drive applications. In FIGS. 1 and 2, a resistor designated as $R_{mr}$ represents the MR head. The head resistor $R_{mr}$ is connected to the preamplifier through a trace-suspension assembly ("TSA"), which may be modeled by a transmission-line or an equivalent RLC network.

It is known that the value of $R_{mr}$ for read/write heads varies widely for different manufacturers of read/write heads. In addition, read/write heads from a given manufacturer can vary significantly. Typical specification limits for $R_{mr}$ range, for example, from about 30 Ω to about 80 Ω.

The preamplifier has an input impedance ($Z_{in}$). For a typical configuration, such as shown in FIGS. 1 or 2, $R_{mr}$ and $Z_{in}$ form a voltage divider, which tends to attenuate the overall preamplifier gain by the factor:

$$\frac{Z_{in}}{R_{mr}+Z_{in}}. \qquad \text{Eq. 1}$$

Consequently, more gain attenuation will result with this configuration as $R_{mr}$ changes from 30 Ω to 80 Ω.

Preamplifier designs are increasingly being implemented with "lower" input impedance $Z_{in}$ values. Because a lower $Z_{in}$ matches closer to a typical $R_{mr}$ value, the preamplifier frequency response tends to be flatter. However, the gain attenuation will be larger than a higher-$Z_{in}$ design for the same $R_{mr}$ range change (see, e.g., Eq. 1).

Figure 3:
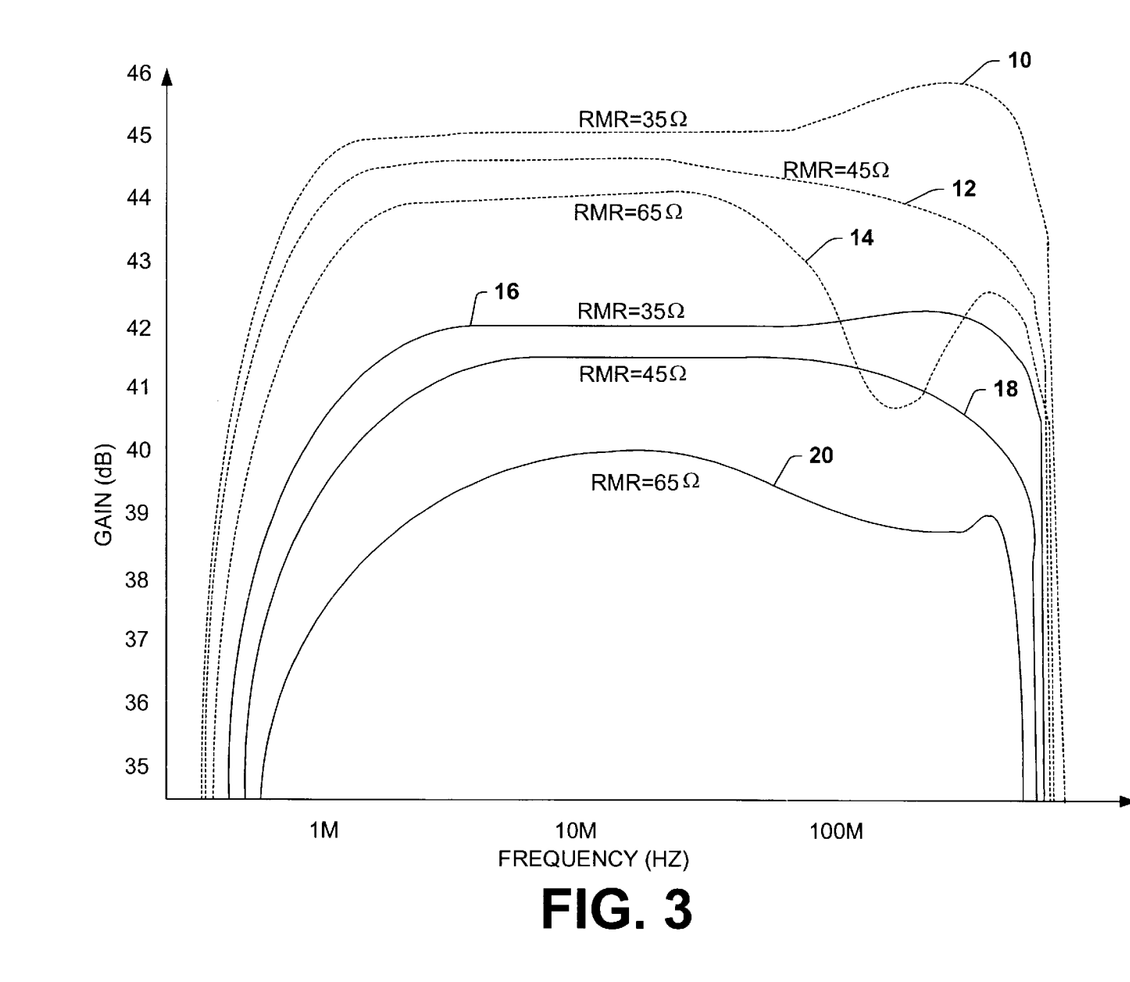
FIG. 3 is a plot of gain versus frequency illustrating several frequency response curves for different conventional preamplifier configurations.

To illustrate the above, FIG. 3 shows frequency response curves 10, 12, 14 for different values of $R_{mr}$, namely for $R_{mr}$=35 Ω, $R_{mr}$=45 Ω, and $R_{mr}$=65 Ω, respectively, for a case of $Z_{in}$=358 Ω. Also illustrated are curves 16, 18, and 20 for $R_{mr}$=35 Ω, $R_{mr}$=45 Ω, and $R_{mr}$=65 Ω, respectively, for a situation where $Z_{in}$=80 Ω. FIG. 3 illustrates that the gain drops as $R_{mr}$ increases. In addition, the range of gain change is greater for smaller values of $Z_{in}$. The frequency-response shape also varies according to the $R_{mr}$ values. AC performance appears better in the case of a lower value of $Z_{in}$. In particular, the low value $Z_{in}$ results in less gain peaking or drooping, and less bandwidth variation over the $R_{mr}$ range.

In order to help accommodate variations in $R_{mr}$, preamplifiers have been designed to allow customers (e.g., hard-disk drive manufacturers) to dial in a different gain setting in an effort accommodate changes in gain due to different values of $R_{mr}$. If the programmable gain range and resolution are sufficient, the mid-band gain can be adequately re-aligned. This approach, however, tends to result in a non-optimized frequency-response shape.

SUMMARY

The present invention provides a system and method that is operative to enhance a frequency response for a preamplifier system. The preamplifier includes an amplifier stage having at least one feedback network. The feedback network has a feedback resistance, which may be adjusted to improve a frequency response of the preamplifier.

By way of illustration, a magneto-resistive read/write head of a hard-disk drive may be coupled to an input of the preamplifier system. The magneto-resistive head has a resistance value. According to one particular aspect of the present invention, the feedback resistance of the feedback network may be controlled as a function of the resistance of the magneto-resistive head, such that the frequency response of the preamplifier system is improved.

By way of further illustration, the control of the feedback resistance may be implemented as a programmable register or a metal-mask trimming option, such as may be part of an integrated circuit chip containing the preamplifier system.

Another aspect of the present invention provides a method for improving a frequency response of preamplifier system, such as may be utilized to receive a signal from a magneto-resistive head of a hard-disk drive. A resistance value of the magneto-resistive head is sensed and employed to select a feedback resistance value for the preamplifier system. The selected feedback resistance value, in turn, is utilized to program the preamplifier system accordingly. For example, the feedback resistance of the preamplifier may be programmed to a value proportional to the resistance value of the magneto-resistive head. As a result, the frequency response for the preamplifier may be substantially optimized.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

DESCRIPTION OF THE INVENTION

The present invention provides a system and method to enhance a frequency response for a preamplifier system associated with a magneto-resistive ("MR") read/write head of a hard-disk drive. This is accomplished by controlling the resistance of one or more feedback resistors of the preamplifier as a function of the MR head resistance.

Figure 4:
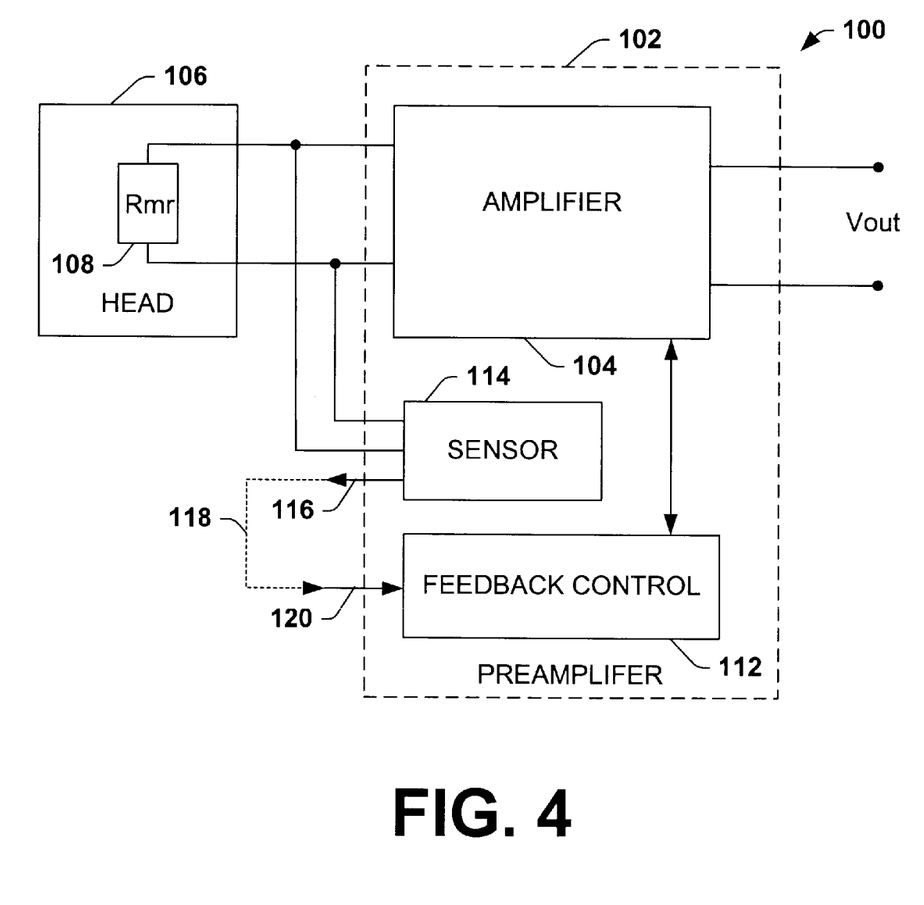
FIG. 4 is a functional block diagram of a system having a preamplifier in accordance with the present invention.

FIG. 4 illustrates a system 100 configured in accordance with an aspect of the present invention. The system 100 includes a preamplifier system 102 that includes an amplifier 104, which is operative to amplify a differential input signal received from an associated MR read/write head 106. The amplifier 104, for example, includes one or more cascaded amplifier blocks connected in series to provide a differential output signal, indicated as $V_{out}$.

The MR head 106 includes a MR resistor 108 having a resistance represented herein as $R_{mr}$. During operation of a hard-disk drive, the value of $R_{mr}$ changes in response to changes in the magnetic flux (e.g., polarity) on the surface of the disk. By applying a voltage (or current) signal through the resistor 108, the voltage across the resistor varies according to the detected magnetic flux on the hard disk. The voltage (or current) signal from the head 106 thus is provided to the preamplifier system 102 as an input signal indicative of the information being read from the disk surface.

In order to deliver a controlled input impedance at the preamplifier system 102, an input stage of the amplifier 104 includes a feedback network, having a resistance value indicated as $R_{fb}$. In accordance with an aspect of the present invention, the feedback resistance $R_{fb}$ is adjustable to help optimize the frequency response of the amplifier. In the example illustrated in FIG. 4, the feedback is controllable by a feedback control system 112. By way of example, the feedback control system 112 is operative to adjust the feedback resistance to a desired level so that a desired frequency response may be obtained. In particular, the feedback resistance $R_{fb}$ may be selected to be proportional to the value of the MR resistor 108.

A sensor 114 may sense the value $R_{mr}$ of the MR resistor 108, such as by monitoring an electrical characteristic (e.g., voltage or current) of the MR resistor in response to providing a known current or voltage across the MR resistor. The sensor 114 provides an output signal 116 having an electrical characteristic indicative of the value $R_{mr}$. The sensor 114, for example, may be implemented as an integrated function of the preamplifier system 102, which is operative to extract the value $R_{mr}$ of the MR resistor 108. Existing preamplifier circuits sometimes include a mechanism for sensing a resistance of the MR resistor 108. While the sensor 114 is illustrated as being internal to the preamplifier system 102, those skilled in the art will understand and appreciate that the sensor alternatively could be located external relative to the preamplifier system.

In accordance with an aspect of the present invention, the sensor signal 116 may be employed to determine a desired value for the feedback resistor $R_{fb}$, such as a value that is proportional to the sensed value of $R_{mr}$. The sensed value of $R_{mr}$ may be used to dial into the preamplifier system 102 an input 120 operative to select a desired value for the feedback resistor $R_{fb}$, which selection is schematically illustrated by dotted line 118. The selection 118 of an appropriate feedback resistor $R_{fb}$, for example, may be made by a person (e.g., a manufacturer), a software selection system, a combination of hardware and software, or combinations thereof according to the teachings contained herein. While the selection 118 is illustrated as occurring external to the preamplifier system 102, those skilled in the art will understand and appreciate that such operation could also be implemented as hardware and/or software, such as may be integrated into the preamplifier and programmed and/or configured to perform this function. The input 120 is employed to set a corresponding value for $R_{fb}$.

Those skilled in the art will understand and appreciate various approaches that may be employed to configure the feedback resistance $R_{fb}$ in accordance with the present invention. For example, the feedback control system 112 may employ a programmable register having a plurality of selectable resistor values, which may be switched into or out of a feedback network of the amplifier 104. Alternatively, a metal-mask option may be integrated into an integrated circuit chip containing the preamplifier system. A user (e.g., a manufacturer) may employ the metal option to "dial in" a selected feedback resistance $R_{fb}$.

Figure 5:
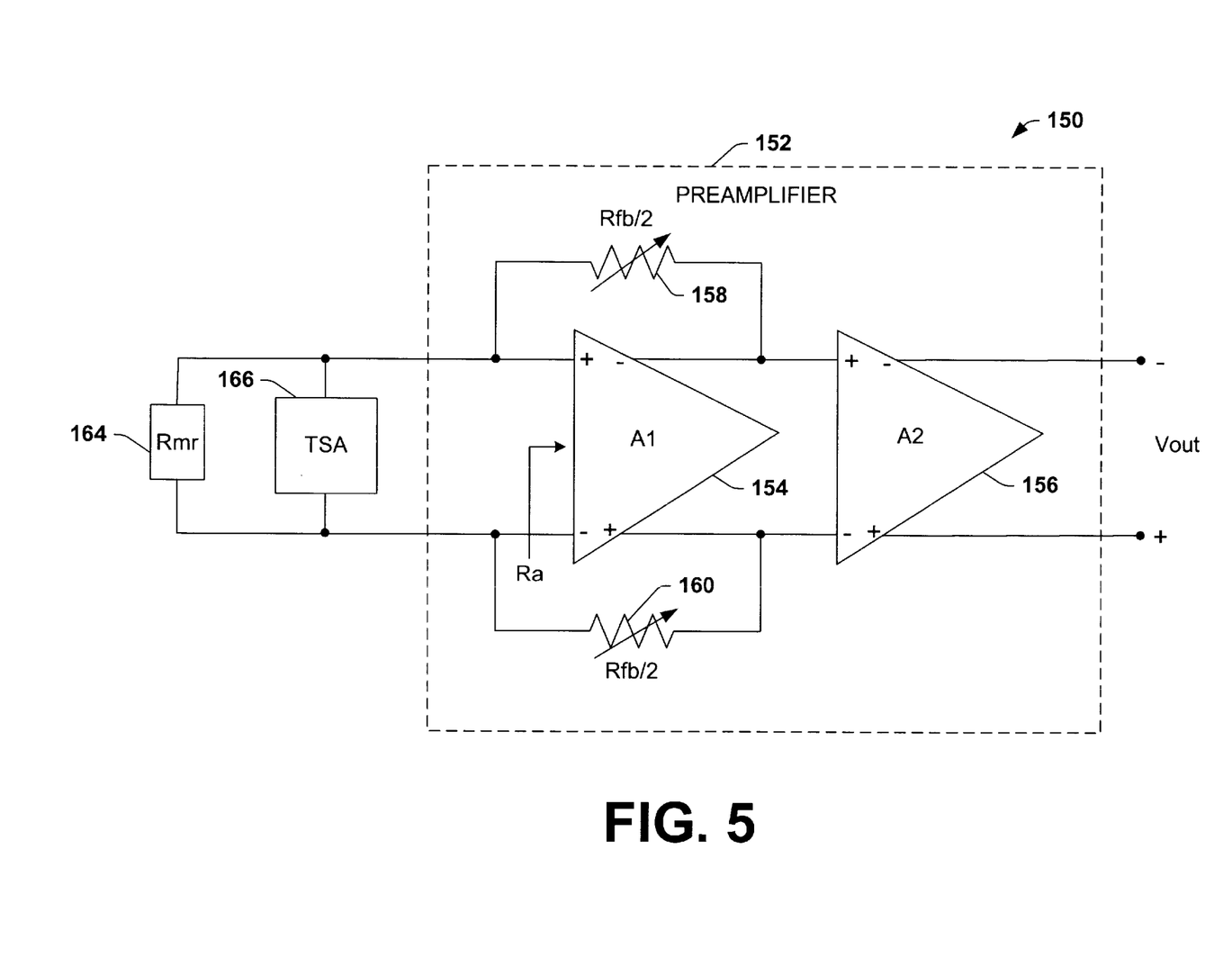
FIG. 5 is a schematic representation of a system having a preamplifier in accordance with the present invention.

FIG. 5 illustrates a schematic representation of a system 150 having a preamplifier 152 that is operative to achieve an improved frequency response in accordance with an aspect of the present invention. The preamplifier 152 may be integrated onto a single chip. The preamplifier 152 is formed, for example, of two cascaded differential amplifier blocks 154 and 156. Each block 154, 156 has a respective gain associated therewith, indicated at A1, A2, respectively. In accordance with an aspect of the present invention, the first amplifier block 154 includes a pair of local resistor feedback networks having variable resistors 158 and 160, each having a resistance of $R_{fb}/2$. The feedback networks are configured to deliver a controlled preamplifier input impedance ($Z_{in}$). The other amplifier block A2 is a "lumped" representation of N cascaded gain stages, where $N \geq 1$. $R_a$ represents the input impedance of the first amplifier block 154 by itself.

The system 150 also includes a MR resistor 164 having a resistance, indicated as $R_{mr}$, connected to the differential inputs of the amplifier block 154. In particular, the MR resistor 164 is coupled to the amplifier block 154 through a trace-suspension assembly ("TSA") 166, which may be modeled, for example, by a corresponding RLC network. An input voltage $V_{in}$ may be connected across the MR resistor 164 to supply a voltage signal across the MR resistor. It is to be understood and appreciated by those skilled in the art that the present invention also is applicable to head bias and sense schemes different from those shown and described herein, as all such variations are contemplated as falling within the scope of the present invention. Also, the present invention is equally applicable to a single-ended amplifier topology.

By way of illustration, for the preamplifier configuration illustrated in FIG. 5, the input impedance $Z_{in}$ of the preamplifier 152 may be expressed as:

$$\frac{1}{Z_{in}} = \frac{A1+1}{R_{fb}} + \frac{1}{R_a} \qquad \text{Eq. 1}$$

It follows that for A1>>1 and $R_a$>>$R_{fb}$/A1, $Z_{in}$ becomes:

$$Z_{in} \approx R_{fb}/A1 \qquad \text{Eq. 2}$$

Thus, by changing $R_{fb}$ as represented by the variable feedback resistors 158 and 160, one can alter $Z_{in}$ to better match the MR head impedance $R_{mr}$ and, in turn, achieve a flatter preamplifier frequency response in accordance with an aspect of the present invention. That is, the feedback resistors 158 and 160 may be set to have resistances proportional the MR resistor 164, so as to achieve a desired frequency response. For example, the variable feedback resistors 158 and 160 may be set to values that vary approximately linearly with the value of the MR resistor.

The gain of the differential preamplifier 152 may be computed as follows:

$$\frac{Vout}{Vin} = \frac{A1 * A2}{R_{mr}\left(\frac{1}{R_{mr}||R_a} + \frac{A1+1}{R_{fb}}\right)} \qquad \text{Eq. 3}$$

$$\cong \frac{A1 * A2}{1 + \frac{A1 * R_{mr}}{R_{fb}}}$$

Two particular cases that may be implemented, in accordance with the present invention, include a matched impedance case and a controlled impedance case. For a matched impedance case, a substantially flat frequency response may be obtained when the preamplifier $Z_{in}$ is matched to the head impedance $R_{mr}$, e.g., by setting:

$$R_{mr} = \frac{R_{fb}}{A1} \qquad \text{Eq. 4}$$

By substituting the MR resistance $R_{mr}$ into the gain equation of Eq. 3, Eq. 3 reduces to:

$$\frac{Vout}{Vin} \cong \frac{A1 * A2}{2} \qquad \text{Eq. 5}$$

It is to be appreciated that gain is halved from the case for an infinite preamplifier input impedance $Z_{in}$. Because a lower gain usually implies higher input-referred noise, there is a tradeoff between frequency response and noise characteristics.

For a controlled impedance case, if $R_{fb}$ is set to a value higher than A1*$R_{mr}$, then it may be shown that $$0.5*(A1*A2) \leq \text{Gain} \leq (A1*A2). \qquad \text{Eq. 6}$$

Thus, by fine-tuning the value of the feedback resistor $R_{fb}$, one can effectively alter the gain and substantially optimize the frequency response of the preamplifier 152 in accordance with an aspect of the present invention. Also, input-referred noise in this case should be lower in the controlled impedance case than the matched impedance case because of the higher gain.

In accordance with an aspect of the present invention, the values of the feedback resistors 158 and 160 are program-mable. As a result, one may choose a smaller $R_{fb}$ value for a head having a smaller $R_{mr}$ value and a larger $R_{fb}$ value may be selected for larger values of $R_{mr}$.

Figure 6:
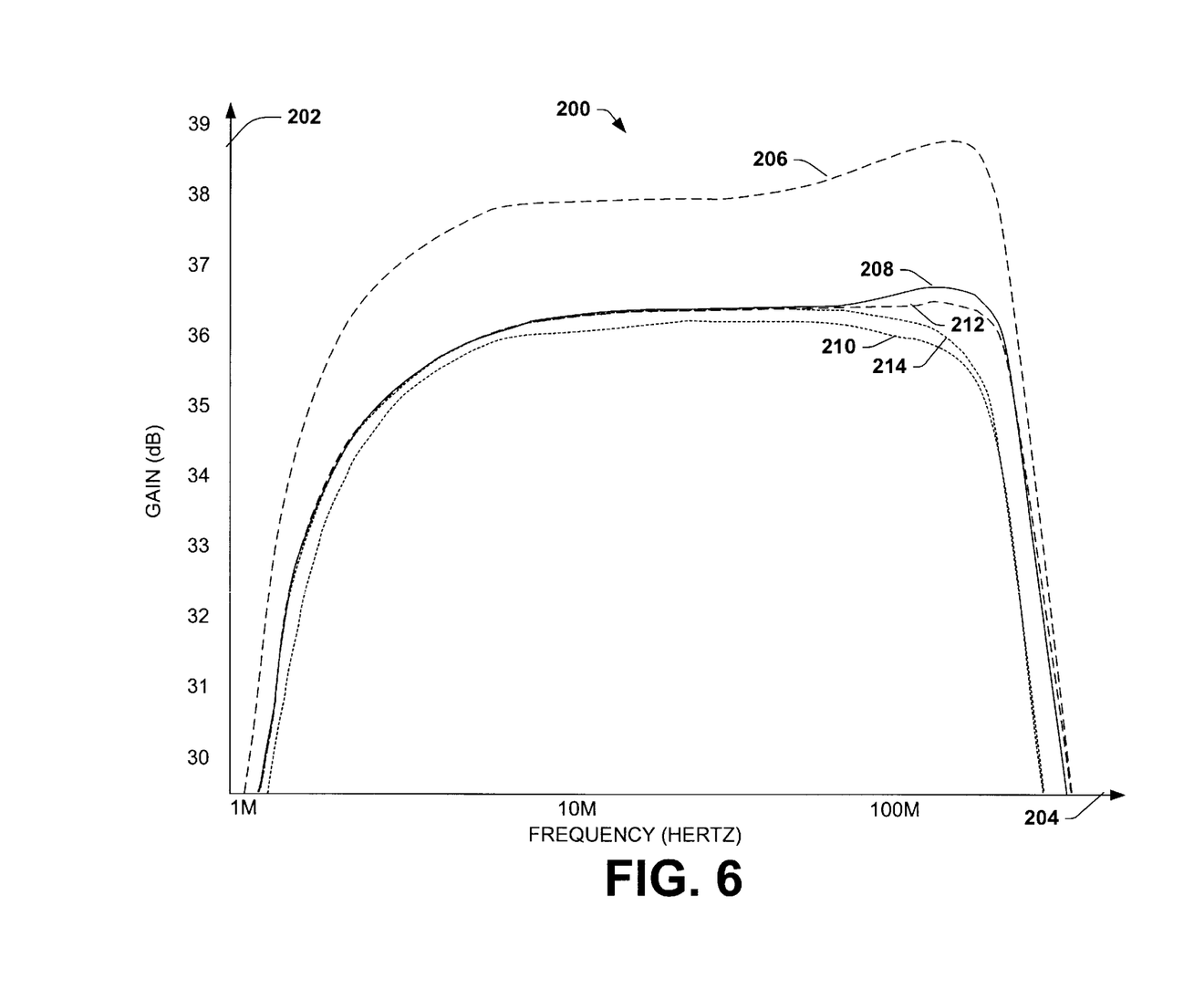
FIG. 6 is a graph of gain versus frequency illustrating frequency responses for differently configured preamplifiers.

FIG. 6 is a graph 200 illustrating several frequency responses for a preamplifier that represents gain (in dB) on a Y-axis 202 as a function of frequency (in Hz) on an X-axis 204. The graph 200 includes a plurality of frequency response curves 206, 208 and 210 for different respective $R_{mr}$ values in a conventional preamplifier system having a $Z_{in}$ of about 80 Ω. In particular, the frequency response 206 is for $R_{mr}$=30 Ω, response 208 is for $R_{mr}$=50 Ω, and response 210 is for $R_{mr}$=80 Ω. Some slight amount of gain peaking is observed even for a nominal case of $R_{mr}$=50 Ω. It should be noted that, as expected, both the mid-band gain and frequency-response shape change significantly from the nominal case as $R_{mr}$ changes.

The graph 200 also includes curves 212 and 214 illustrating frequency responses of a preamplifier system having feedback resistors programmed in accordance with an aspect of the present invention. In particular, the curve 212 is for a frequency response 212 when $R_{mr}$=30 Ω and the curve 214 is for a frequency response 214 when $R_{mr}$=80 Ω, both for a preamplifier system having a $Z_{in}$ of about 80 Ω. For example, where the preamplifier is initially configured for operation with $R_{mr}$ having a nominal value of 50 Ω, the feedback resistance $R_{fb}$ is reduced relative to its initial nominal value when $R_{mr}$=30 Ω, and the feedback resistance $R_{fb}$ is increased when $R_{mr}$=80 Ω. The change in the feedback resistance value may be approximately proportional to the sensed $R_{mr}$ value relative to its defined nominal value. By way of further illustration, the feedback resistance $R_{fb}$ for the curves 212 and 214 may be set as follows:

$$R_{fb}(R_{mr}=30\ \Omega) = 0.57 * R_{fb}(R_{mr}=50\ \Omega) \text{ and} \qquad \text{Eq. 7}$$

$$R_{fb}(R_{mr}=80\ \Omega) = 1.87 * R_{fb}(R_{mr}=50\ \Omega),$$

As can be seen from curves 212 and 214 of FIG. 6, the programmed $R_{fb}$ values result in substantially the same mid-band gain for all $R_{mr}$ cases. In addition, the frequency response curves 212 and 214 exhibit significantly improved frequency-response shapes for the two respective $R_{mr}$ cases that are different from the nominal 50 Ω case.

It thus is to be appreciated that if $R_{fb}$ is made to vary by about the same percentage change as $R_{mr}$, substantially the same gain will result for all $R_{mr}$ cases. Because about the same gain change due to $R_{mr}$ change is getting adjusted at approximately the same location where the gain change occurs, signal integrity throughout the preamplifier, as measured by Total Harmonic Distortion, should remain substantially the same irrespective of the $R_{mr}$ value. As a result, redesign efforts are greatly mitigated. In addition, noise characteristics should remain about the same for different values of $R_{mr}$. Because, in accordance with an aspect of the present invention, $Z_{in}$ is made to "track" the source impedance given by $R_{mr}$, substantially optimized frequency-response shapes should result for different values of $R_{mr}$.

Figure 7:
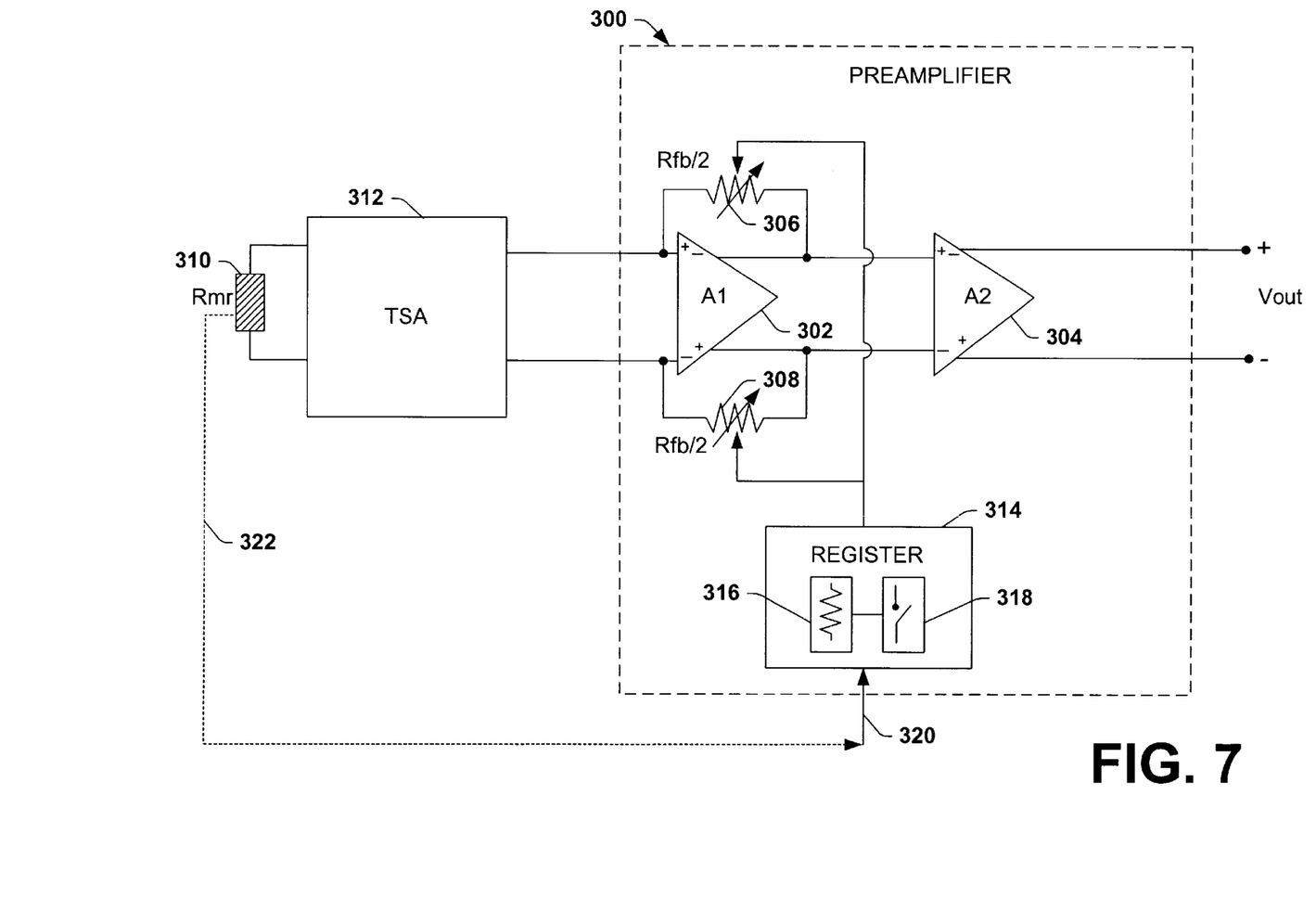
FIG. 7 is an example of a system having a preamplifier in accordance with the present invention.

By way of illustration, FIG. 7 illustrates a preamplifier 300 implemented in accordance with an aspect of the present invention. The preamplifier 300 includes one or more cascaded differential amplifier blocks 302 and 304. Each amplifier block 302, 304 has a respective gain indicated at A1, A2. The first amplifier block 302 includes a pair of resistor feedback networks 306 and 308, which are programmable in accordance with an aspect of the present invention. For example, the feedback resistance value of each network 306, 308 may be selected to have a predetermined nominal value for optimizing the gain and frequency characteristics of the preamplifier when used in conjunction with a read/write head having a nominal resistance value of about 50 Ω. The other amplifier block 304 is a "lumped" representation of N cascaded gain stages, where N≧1. It is to be understood and appreciated, however, that the present invention is equally applicable to a single stage preamplifier system.

A MR head of a hard-disk drive, which is schematically represented as a MR resistor $R_{mr}$ 310, is connected to the preamplifier 300 through a trace-suspension assembly ("TSA") 312. The TSA 312 may be modeled by a transmission-line or its equivalent RLC network.

According to an aspect of the present invention, the preamplifier system 300 includes a programmable register 314, which is operative to control the feedback resistor networks 306 and 308 associated with the first amplifier block 302. For example, the register 314 may be integrated into the chip containing the preamplifier system 300, which is programmed to control the feedback resistance value $R_{fb}$ in response to the selection input signal 320. The register may include a plurality of resistance values, such as in the form of a matrix, schematically indicated at 316.

By way of further illustration, the register 314 includes a switching network (e.g., NMOS and/or PMOS switching transistors) 318 that is coupled to the resistor network 316 to switch a selected feedback resistance in or out of the amplifier block 302. In order to help minimize switch resistance variations, it may be desirable to design the first stage of the amplifier with a large initial gain.

The register 314 includes an input for receiving an input signal 320 to set the feedback resistors. The signal 320, for example, is used to control activation and deactivation of the switching network to connect selected resistances from the resistor network 316 into the feedback paths of the amplifier 302. The signal 320, for example, is based on a sensed value of the $R_{mr}$ 310, which is diagrammatically represented by a dotted line 322. Those skilled in the art will appreciate various approaches that may be employed to sense the $R_{mr}$ and dial in a desired value for the feedback resistor networks 306 and 308, all of which are contemplated as falling within the scope of the present invention.

Figure 8:
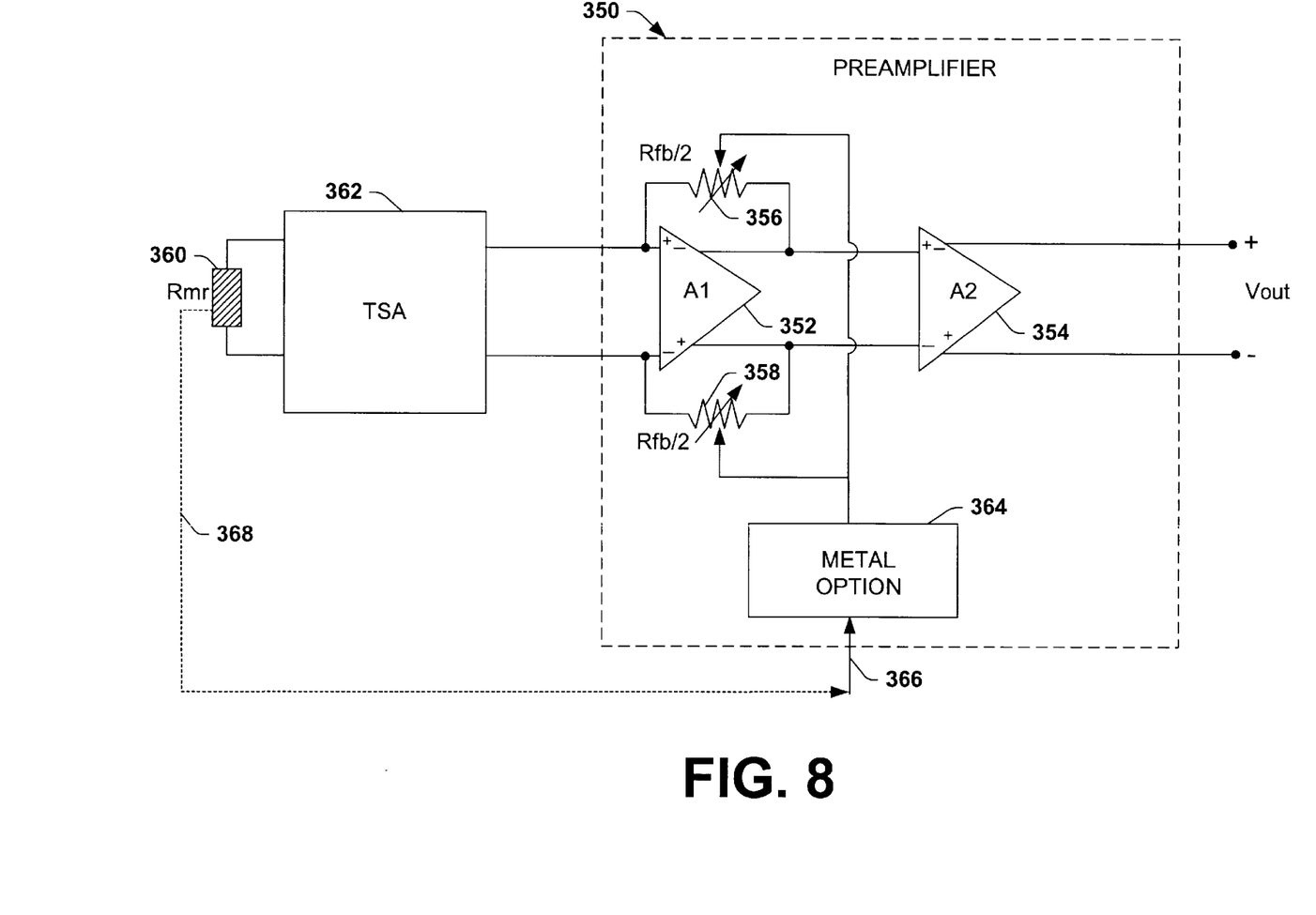
FIG. 8 is another example of a system having a preamplifier in accordance with the present invention.

FIG. 8 illustrates an example of an amplifier system in accordance with another aspect of the present invention. Because the system 350 is substantially similar to that just described with respect to FIG. 7, details concerning similar items have been omitted for sake of brevity.

The preamplifier 350 includes one or more cascaded differential amplifier blocks 352 and 354. The first amplifier block 352 includes a pair of feedback networks 356 and 358 having resistances, which are programmable in accordance with an aspect of the present invention. A MR resistor $R_{mr}$ 360, which represents the resistance of a MR head for use in a hard-disk drive, is coupled to the preamplifier 300 through a TSA 362.

The preamplifier system 350 further includes a metal-mask trimming system 364, such as may be integrated into the chip containing the preamplifier. The metal option 364 is user-programmable to set the value of the feedback resistor $R_{fb}$. A resistor selection signal 366 (e.g., a predetermined voltage level) may be input to the metal option system 364 to selectively set a desired level of feedback resistance across the amplifier block 352. According to an aspect of the present invention, the feedback resistance is selected to be proportional to the value of the $R_{mr}$ 360 relative to a nominal $R_{mr}$ resistance (e.g., 50 Ω). An operational relationship between the $R_{mr}$ and the feedback selection is schematically indicated by a dotted line 368. For example, the metal option 364 may include a fused link, which may be set to adjust an electrical characteristic of the feedback network so as to provide a selected level of feedback resistance across the first amplifier block 352. An advantage of this approach is that no switches are required.

Those skilled in the art will understand and appreciate numerous algorithms or control techniques that may be implemented, in accordance with the present invention, to selectively control the feedback resistance and such alternatives are contemplated as falling within the scope of the present invention.

Figure 9:
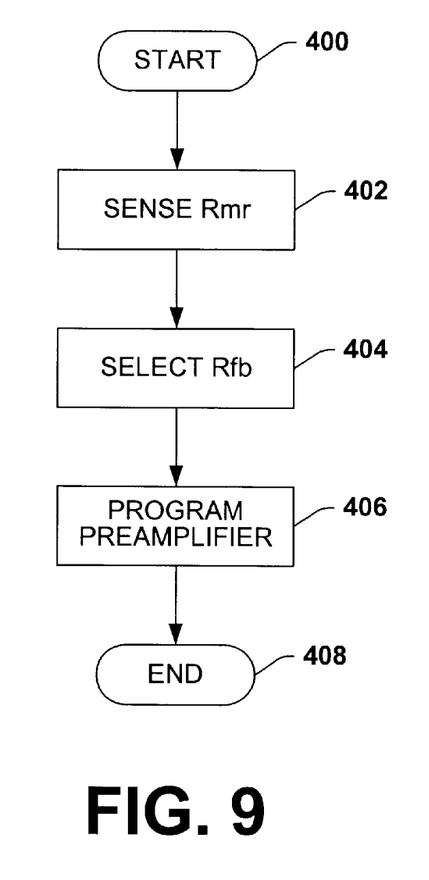
FIG. 9 is a flow diagram illustrating a methodology for programming a preamplifier in accordance with the present invention.

In view of the foregoing structural and functional features described above, a methodology according to the present invention will be better appreciated with reference to FIG. 9. While, for purposes of simplicity of explanation, the methodology of FIG. 9 is shown and described in a serial manner, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect the present invention. It is further to be appreciated that the following methodology may be implemented as computer-executable instructions, such as software stored in a computer-readable medium. Alternatively, the methodology may be implemented as hardware or a combination of hardware and software.

Turning now to FIG. 9, the methodology begins at step 400, such as in connection with applying power to a preamplifier system. The preamplifier system, for example, includes one or more amplifier stages, the first stage having a feedback network connected between an input and an output thereof. The resistance of the feedback network is indicated as $R_{fb}$ in FIG. 9. A magneto-resistive read/write head is connected to the input of the first stage amplifier. The read/write head is responsive to changes in magnetic flux, such as may be detected from an associated surface of a hard-disk drive. The read/write head has a MR resistance, indicated at $R_{mr}$.

From 400, the methodology proceeds to 402 in which the $R_{mr}$ is sensed. For example, the $R_{mr}$ may be sensed by a sensor, such as may be an integrated part of the preamplifier or it may be external to the preamplifier. Next at 404, a feedback resistance value $R_{fb}$ is selected. For example, the selection may be made by a person based on the sensed value of $R_{mr}$. Alternatively, the selection may be made by software, hardware, or a combination of hardware and software (with or without assistance of a person). Such hardware or software may be programmed and/or configured to select a feedback resistance, such as to be proportional to the $R_{mr}$ sensed at 402.

From 404, the methodology proceeds to 406 in which the preamplifier is programmed, such that the feedback resistance $R_{fb}$ is set proportional to the $R_{mr}$. The programming, for example, may be implemented through a programmable register that applies a selected level of resistance in or out relative to the feedback network to provide a desired aggregate feedback resistance. Alternatively, the programming may be implemented through a metal option associated with the preamplifier system, such as, for example, shown and described with respect to FIG. 8. After the feedback resistance $R_{fb}$ is appropriately programmed, the methodology ends at 408.

Although the invention has been shown and described with respect to certain embodiments, it will be appreciated that equivalent alterations and modifications will occur to others skilled in the art upon the reading and understanding of this specification and the annexed drawings. In particular, regard to the various functions performed by the above described components (assemblies, devices, circuits, systems, etc.), the terms (including a reference to a "means") used to describe such components are intended to correspond, unless otherwise indicated, to any component which performs the specified function of the described component (i.e., that is functionally equivalent), even though not structurally equivalent to the disclosed structure, which performs the function in the herein illustrated exemplary embodiments of the invention. In this regard, it will also be recognized that the invention includes a computer-readable medium having computer-executable instructions for performing the steps of the various methods of the invention. In addition, while a particular feature of the invention may have been disclosed with respect to only one of several embodiments, such features may be combined with one or more other features of the other embodiments as may be desired and advantageous for any given or particular application. Furthermore, to the extent that the terms "includes", "including", "has", "having", and variants thereof are used in either the detailed description or the claims, these terms are intended to be inclusive in a manner similar to the term "comprising."

What is claimed is:

1. A preamplifier system for a hard-disk drive, comprising:
    an amplifier including at least one feedback network connected between an input and an output of the amplifier, the at least one feedback network having a resistance associated therewith; and
    a feedback control system operative to adjust the resistance of the feedback network to a value functionally related to a resistance of an associated read/write head.

2. The system of claim 1 where the feedback control system further comprises a plurality of selectable conditions, each condition, when selected, being operative to apply an associated resistance relative to the feedback network to adjust the resistance of the feedback network accordingly.

3. The system of claim 1, further comprising a sensor operative to sense the resistance of the read/write head and provide an indication of the sensed value.

4. The system of claim 3, wherein the feedback control system has an input which is operative to receive an instruction to adjust the feedback resistance to a value proportional to the sensed value of the resistance of the read/write head.

5. The system of claim 1, wherein the feedback control system has an input operative to receive an instruction to adjust the feedback resistance to a value proportional to the resistance of the read/write head.

6. The system of claim 1, wherein the amplifier is a first amplifier operable to receive a signal from the read/write head, the system further comprising a second amplifier coupled to the output of the first amplifier.

7. A preamplifier system for a hard-disk drive, comprising:
    an amplifier including at least one feedback network connected between an input and an output of the amplifier, the at least one feedback network having a resistance associated therewith; and
    a feedback control system operative to adjust the resistance of the feedback network to a value functionally related to a resistance of an associated real/write head,
    wherein the feedback control system further comprises a register operative to selectively switch at least one of a plurality of resistor into the feedback network of the amplifier.

8. The system of claim 7, wherein the register further comprises a switch network coupled to a resistor network having the plurality of resistors the switch network being operative to connect the at least one of the plurality of resistors relative to the feedback network to provide the amplifier with a feedback resistance proportional to the resistance of the feedback network and the at least one of the plurality of resistors.

9. A preamplifier system for a hard-disk drive, comprising:
    an amplifier including at least one feedback network connected between an input and an output of the amplifier, the at least one feedback network having a resistance associated therewith;
    a feedback control system operative to adjust the resistance of the feedback network to a value functionally related to a resistance of an associated read/write head;
    a sensor operative to sense the resistance of the read/write head and provide an indication of the sensed value;
    wherein the feedback control system has an input which is operative to receive an instruction to adjust the feedback resistance to a value proportional to the sensed value of the resistance of the read/write head, and
    an integrated circuit that includes the sensor and the amplifier.

10. A preamplifier system for a hard-disk drive, comprising:
    an amplifier including at least one feedback network connected between an input and an output of the amplifier, the at least one feedback network having a resistance associated therewith;
    a feedback control system operative to adjust the resistance of the feedback network to a value functionally related to a resistance of an associated read/write head; and
    an integrated circuit that includes the preamplifier and the feedback control system.

11. A preamplifier system for a hard-disk drive, comprising:
    a circuit for amplifying a signal received from a read/write head;
    a feedback circuit for connected across the amplifying circuit for providing a controlled impedance for the amplifying means;
    a control circuit for controlling a resistance of the feedback circuit to improve a frequency response of the preamplifier system, and
    a sensing circuit for sensing a resistance of a read/write head coupled to the system, the control circuit receiving an input signal for selecting the resistance of the feedback circuit.

12. The system of claim 11, wherein the control means is operative to program the feedback circuit to have a resistance proportional to the sensed resistance.

13. A disk drive system comprising:
    a magneto-resistive read/write head having a resistance associated therewith;
    a preamplifier system having an amplifier coupled to the read/write head and operative to receive a signal therefrom, a feedback network having a resistance being connected to an input to an input and an output of the amplifier, a feedback control system associated with the feedback network, the feedback control system being operative to adjust the resistance of the feedback network according to an input signal received thereby; and a sensor operative to sense the resistance of the read/write head and to provide a signal indicative of the sensed resistance, the feedback control system being operative to adjust the resistance of the feedback network to a resistance proportional to the sensed resistance of the read/write head.

14. The system of claim 13, wherein the sensor is part of the preamplifier system.

15. A disk drive system comprising:

a magneto-resistive read/write head having a resistance associated therewith;

a preamplifier system having an amplifier coupled to the read/write head and operative to receive a signal therefrom, a feedback network having a resistance being connected to an input and an output of the amplifier, a feedback control system associated with the feedback network, the feedback control system being operative to adjust the resistance of the feedback network according to an input signal received thereby;

a sensor operative to sense the resistance of the read/write head and to provide a signal indicative of the sensed resistance, the feedback control system being operative to adjust the resistance of the feedback network to a resistance proportional to the sensed resistance of the read/write head;

wherein the sensor is part of the preamplifier system, and an integrated circuit that includes the preamplifier system.

16. A disk drive system comprising:

a magneto-resistive read/write head having a resistance associated therewith;

a preamplifier system having an amplifier coupled to the read/write head and operative to receive a signal therefrom, a feedback network having a resistance being connected to an input and an output of the amplifier, a feedback control system associated with the feedback network, the feedback control system being operative to adjust the resistance of the feedback network according to an input signal received thereby;

wherein the feedback control system further comprises a register operative to selectively switch at least one of a plurality of resistors into the feedback network of the amplifier.

17. The system of claim 16, wherein the register further comprises a switch network coupled to a resistor network having the plurality of resistors, the switch network being operative to connect the at least one of the plurality of resistors relative to the feedback network to provide the amplifier with a feedback resistance functionally related to the resistance of the feedback network and the at least one of the plurality of resistors.

18. A disk drive system comprising:

a magneto-resistive read/write head having a resistance associated therewith;

a preamplifier system having an amplifier coupled to the read/write head and operative to receive a signal therefrom, a feedback network having a resistance being connected to an input and an output of the amplifier, a feedback control system associated with the feedback network, the feedback control system being operative to adjust the resistance of the feedback network according to an input signal received thereby;

wherein the feedback control system further comprises a plurality of selectable conditions, each condition, when selected, being operative to apply an associated resistance relative to the feedback network to adjust the resistance of the feedback network accordingly.

19. A method to improve a frequency response of a preamplifier system of a hard-disk drive, the preamplifier system having a feedback network, comprising:

sensing a resistance of a read/write head; and setting a resistance of the feedback network based on the sensed resistance of the read/write head.

20. The method of claim 19, further comprising selecting the resistance of the feedback network based on the sensed resistance, the resistance of the feedback network being set to the selected resistance.

* * * * *